United States Patent [19]
Hirano

[11] 4,088,393
[45] May 9, 1978

[54] FIELD EFFECT MODE LIQUID CRYSTAL DISPLAY MATERIALS

[75] Inventor: Masao Hirano, Nagaokakyo, Japan

[73] Assignee: Omron Tateisi Electronics Co., Kyoto, Japan

[21] Appl. No.: 645,623

[22] Filed: Dec. 31, 1975

[51] Int. Cl.² ............................ G02F 1/13; C09K 3/34
[52] U.S. Cl. .................................... 350/350; 252/299; 252/408
[58] Field of Search ............ 350/160 LC, 160 R, 150; 252/408, 299

[56] References Cited

U.S. PATENT DOCUMENTS

| | | | |
|---|---|---|---|
| 3,806,229 | 4/1974 | Schoot et al. | 252/408 |
| 3,806,230 | 4/1974 | Haas | 350/160 LC |
| 3,814,700 | 6/1974 | Aviram et al. | 252/408 LC |
| 3,815,972 | 6/1974 | Hsieh | 252/299 |
| 3,833,287 | 9/1974 | Taylor et al. | 350/160 LC |
| 3,838,059 | 9/1974 | Wong | 252/299 |
| 3,891,307 | 6/1975 | Tsukamoto et al. | 350/160 LC |
| 3,932,298 | 1/1976 | Labes | 252/299 |
| 3,975,285 | 8/1976 | Ohnishi et al. | 252/299 |
| 3,979,320 | 9/1976 | Ozutusmi et al. | 252/299 |
| 3,990,984 | 11/1976 | Barret et al. | 350/160 LC |
| 4,023,259 | 5/1977 | Kubota et al. | 350/160 LC |

FOREIGN PATENT DOCUMENTS

| | | | |
|---|---|---|---|
| 4,995,881 | 9/1974 | Japan | 252/299 |

OTHER PUBLICATIONS

Ohnishi, Y., et al., Appl. Phys. Lett., vol. 24, No. 5, pp. 213–216, (1974).
Baise, A. I., et al., Appl. Phys. Lett., vol. 21, No. 4, pp. 142–143, (Aug. 1972).
Schoot, C. J., et al., Appl. Phys. Lett., vol. 23, No. 2, pp. 64–65, (Jul. 1973).

*Primary Examiner*—Benjamin R. Padgett
*Assistant Examiner*—T. S. Gron
*Attorney, Agent, or Firm*—Flehr, Hohbach, Test, Albritton & Herbert

[57] ABSTRACT

A redox dopant for incorporation into the electrolytic conducting medium of an electro-optical display to increase the life of the electrodes in the same. Suitable dopants include ascorbic acid, hydroquinone, or para-benzoquinone incorporated into the twist nematic liquid crystal layer of a field effect display device.

7 Claims, 1 Drawing Figure

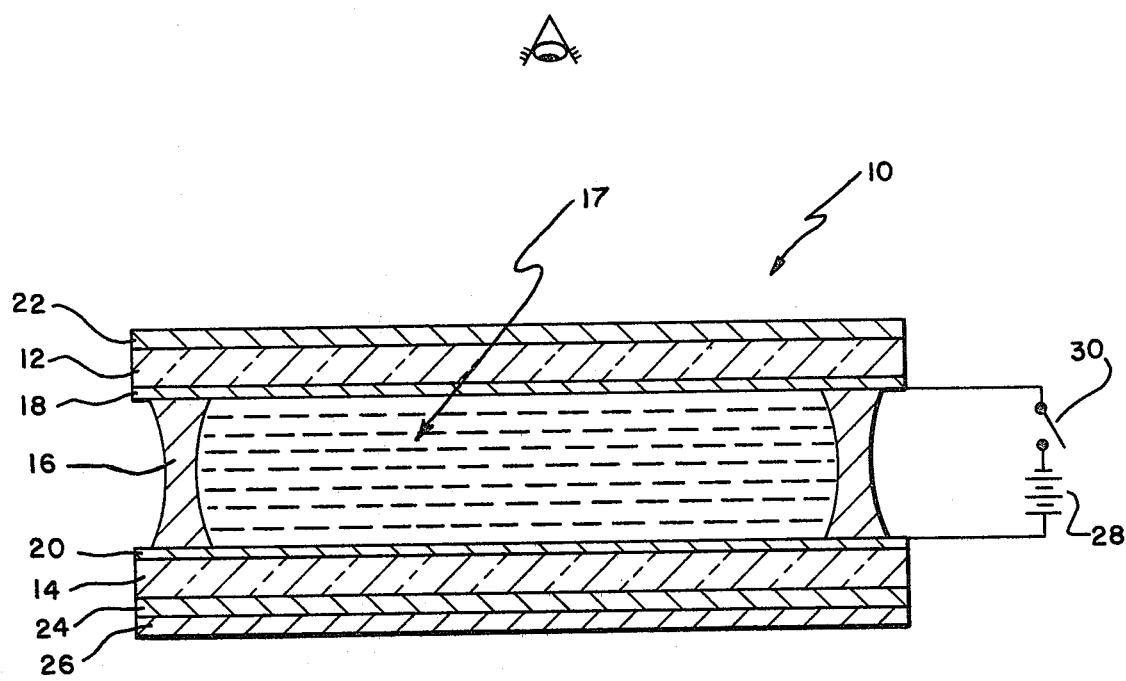

FIELD EFFECT MODE LIQUID CRYSTAL DISPLAY MATERIALS

BACKGROUND OF THE INVENTION

Liquid crystal displays are of two general types. One employs a light scattering effect, generally known as dynamic scattering, while the other employs polarized light with the liquid crystal characterized by twist nematic properties. Both types of displays can be used as low power devices by use of a reflector panel placed behind the display so that ambient light or a lower power light source can be used to illuminate the display.

In a light scattering display, the liquid crystal material is initially transparent. When activated by applying an electric field, the material is converted to a milky white state. This is caused by the creation of scattering centers in the liquid. When the voltage is removed, the material returns to its transparent state.

Liquid crystal displays of the dynamic scattering mode are activated to maximum scattering by current on the order of 1 to $5 \times 10^{-6}$ amperes in a typical dynamic scattering liquid crystal display of $10\mu$ thickness to consume $10^{-4}$ to $10^{-5}$ watts/cm$^2$ of display area. This current and power is of sufficient intensity to deteriorate the liquid crystal. This occurs long prior to erosion of the electrodes. Therefore, to extend the life of such systems, emphasis has been placed upon extending the life of the liquid crystal itself.

Certain work has been performed to increase the electrical conductivity of liquid crystals in the dynamic scattering mode. In an article at pages 24 and 25 of the Japanese magazine, "Nikkei Electronics", dated Apr. 22, 1974, the addition of equimolar quantities of hydroquinone and parabenzoquinone is disclosed to increase the conductivity of a dynamic scattering mode display device upon application of an electrical field. The article includes experimental data which indicates that the hydroquinone and parabenzoquinone should be used only in equimolar combination to provide complex ions in the liquid crystal for this purpose.

In the field effect type of liquid crystal display, a twist nematic material is placed in a thin film between transparent electrodes in the form of a 90° twist from the inner surface of one electrode to the inner surface of the other one. Unpolarized light is linearly polarized in the Y-direction by the first polarizer and follows the 90° twist as it passes through the liquid crystal and arrives properly oriented in the X-direction parallel to the second polarizer. Light is then reflected back through the liquid crystal material following the 90° twist, arriving aligned in a Y-direction and will pass out through the first polarizer. To an observer, the display looks clear bright. When the electric field is applied across the two electrodes, the liquid crystal molecules align themselves with the field so that unpolarized light passes through the field aligned liquid crystal film without changing polarization, and is absorbed by the X-direction polarizer. The display looks black due to the absence of reflected light. When the electric field is removed, the liquid crystal resumes its 90° twist configuration. In an alternative embodiment, if the polarizers are oriented parallel to each other, the display appears black without an electric field and clear bright when an electric field is applied.

In contrast to the conventional dynamic scattering displays, a relatively low current, e.g., $10^{-7}$ to $10^{-8}$ amperes, is required to untwist a field effect liquid crystal at $10\mu$ thickness. Also, less power is consumed, e.g., $10^{-6}$ to $10^{-7}$ watts/cm$^2$. It has been found that at such low current and power consumption, the limiting factor on the life of the display device is the electrode life rather than the liquid crystal life.

SUMMARY OF THE INVENTION AND OBJECTS

In accordance with the present invention, a redox dopant is dispersed in the electrically conductive medium of an electro-optical display device to increase the life of the electrodes. Preferred dopants include ascorbic acid, hydroquinone, and parabenzoquinone. Such dopants are particularly advantageous for use in conjunction with display systems of the field effect type because, as set forth above, the limiting factor on the life of such systems operating at relatively low current and power consumption is the life of the electrodes rather than the life of the liquid crystal material.

It is an object of the invention to provide a dopant for the electrically conductive medium of an electro-optical display device which increases the life of the electrodes.

It is a particular object of the invention to provide a dopant for the foregoing purpose for use in a long-life, low current display device as of the field effect type.

Further objects and features of the invention will be apparent from the following description taken in conjunction with the appended drawing in which the preferred embodiments of the invention are set forth.

BRIEF DESCRIPTION OF THE DRAWING

The single FIGURE is a schematic view of an electro-optical display device of the field effect type useful in the present invention.

DETAILED DESCRIPTION OF THE PREFERRED EMBODIMENTS

Referring to the drawing, an electro-optical display is illustrated of the field effect type and is generally designated by the number 10. It comprises a pair of transparent plates, 12 and 14, separated by means of a suitable gasket 16. The plates are typically formed of glass in a thickness of about $10\mu$. The space defined between the plates and gaskets is a cavity 17 filled with a layer of a liquid crystal material in the nematic phase with a positive dielectric anisotropy. One well known system of liquid crystal is of the Schiff base type comprising a eutectic mixture of N-(p-methoxybenzylidene)-p'-n-butylaniline, commonly referred to as "MBBA" and of N-(p-ethoxybenzilidene)-p'-n-butylaniline, commonly referred to as "EBBA". As a third component in the group is a material of positive dielectric anisotropy, e.g., "N-(p-cyanobenzilidene)-p'-alkylaniline or N-(p-alkylbenzilidene)-p'-aminobenzonitrile". A typical cell spacing between the plates for a liquid crystal material of the foregoing type is about $10-12\mu$.

Transparent electrodes 18 and 20 are layered onto plates 12 and 14, respectively. Suitable transparent conductive materials include tin oxide or indium oxide. Polarizers 22 and 24 cover electrodes 18 and 20, respectively, and are arranged orthogonal to each other. The liquid crystal molecules at the inner surface of an electrode are aligned parallel to the polarizer for that electrode. Since the polarizers are orthogonal to each other, the film or liquid crystal is in the form of a 90° twist from the inner surface of one electrode to the inner surface of the other electrode. A reflector 26 is disposed adjacent to polarizer 24. A source of an electric field, such as battery 28, is connected across electrodes 18 and 20. An on-off switch 30 is provided to activate and de-activate the circuit.

One technique for aligning the liquid crystal into a 90° twist is to treat the surfaces of electrodes 18 and 20 exposed to the liquid crystal in directions 90° to each other. In this manner, the foregoing materials assume the 90° twist configuration. One treating technique is to rub the electrode surfaces unidirectionally at right angles to each other as with a cotton cloth. This technique is fully described in U.S. Pat. No. 3,731,986. The aforementioned polarizer plates 22 and 24 are aligned with the direction of rubbing.

The method of constructing an electro-optical device of the foregoing general type is well known as set forth, for example, in U.S. Pat. No. 3,881,809.

In operation of the above device, unpolarized light is linearly polarized in the Y-direction by the first polarizer. This light follows the 90° twist through the liquid crystal and arrives properly oriented in the X-direction, parallel to the second polarizer. The light is now reflected back through the liquid crystal material from reflector 26, following the 90° twist, arriving aligned in the Y-direction and will pass out through the first polarizer. To an observer, the display looks clear bright.

When switch 30 is closed to activate the electric field across electrodes 18 and 20, the molecules "stand-up" almost 90° to the surface of the electrodes. Unpolarized light is linearly polarized in the Y-direction by the first polarizer. This linearly polarized light now passes through the field aligned liquid crystal without changing its Y-direction polarization, and is absorbed by the X-direction polarizer. To an observer, the display looks black due to the absence of reflected light. When the electric field is removed, the liquid crystal resumes its 90° twist.

In an alternative embodiment, the polarizers may be oriented parallel to each other. Here, the display appears black with switch 30 open and clear bright with switch 30 closed. Since the most conventional choice for a display is dark digits on a light background, the polarizers are most commonly oriented at a 90° angle to each other. Other alternative displays are of the transmissive type. The general principles of construction and operation of both field effect and dynamic scattering displays are set forth in the article by Castellano et al entitled "Liquid Crystal Displays in Low Power Applications", presented at the 1974 IEEE Intercon Session 25, Paper 3, New York, N.Y., incorporated herein by reference.

In accordance with the present invention, the life of electrodes 18 and 20 is substantially enhanced by the dispersion of a redox dopant in a minor proportion in the liquid crystal.

Suitable redox dopants are ones which are capable of being reversibly oxidized in the presence of an electric field. They include ascorbic acid, hydroquinone, and parabenzoquinone, and mixtures of the same.

In a liquid crystal display, such dopant may comprise on the order of 0.05% to 1% by weight of the liquid crystal. At levels significantly below this level, the effect of increasing the life of the electrode is reduced. The upper end of the range is determined by the solubility of limits of the dopant in the liquid crystal material and by any possible adverse effects upon the display. A preferred range is from 0.1% to 0.3% to as high as 0.5% by weight.

Ascorbic acid is a preferable dopant because of its stability at normal temperatures and availability at high purity.

It has been found that in a typical field effect cell in which current is supplied at approximately $10^{-7}$ to $10^{-8}$ amperes in a display of $10\mu$ thickness and a power consumttion of $10^{-6}$ to $10^{-7}$ watts/cm$^2$, the life of the electrodes is on the order of 1,000 hours with the DC8V constant supply at room temperature. With the addition of a redox dopant of the foregoing type, the life of the display is increased to a level on the order of 3,000 hours with the same DC supply at room temperature.

It is believed that the above extended life with the use of a redox dopant may be explained according to the following theory. It is apparent that a certain amount of energy consumption occurs in the vicinity of the anode and cathode to cause the deterioration of such electrodes. The presence of the reversibly oxidized and reduced dopant in these areas enables the attack to be centered upon the dopant rather than the electrodes. Thus, at the anode, the dopant is oxidized while, at the cathode, the oxidized dopant is reduced. There may be sufficient mobility in the liquid crystal material to establish a path of the dopant between the anode and cathode. In this manner, the energy which would otherwise attack the electrodes is consumed by the mobile redox dopant.

The foregoing system has been described in the environment of a field effect type of electro-optical display device with a specific nematic material. It should be understood that other known materials such as of the ester and biphenyl type may be employed as the liquid crystal composition. Also, other electro-optical systems such as of the dynamic scattering liquid crystal type, the electrochromic type, and the cataphoresis liquid type, may also be employed. In each of these instances, the dopant is dispersed in the electrically conductive medium disposed between the electrodes.

In a typical dynamic scattering liquid crystal device, the structure of the foregoing type is employed with the elimination of the polarizers. As set forth above, prior to application of an electric field, the crystals are aligned and appear transparent. When activated, the liquid crystal scatters the light in a forward direction which is then reflected from a reflector behind the display through the liquid crystal material where it is forward-scattered again. Due to this scattering, the activated liquid crystal appears milky white or opalescent to the viewer. When the field is de-activated, the liquid crystal again align perpendicular to the enclosure to plates to transmit the liquid. Typical systems of the dynamic scattering type are set forth in detail in the foregoing Castellano et al article, and in U.S. Pat. Nos. 3,322,485, 3,655,269, and 3,655,270. Suitable dynamic scattering liquid crystal compositions include: (a) a binary mixture of p-methoxybenzilidene-p'-n-butylaniline and p-ethoxybenzilidene-p'-n-butylaniline, (b) a ternary mixture of 4-ethoxybenzilidene-4'-n-butylaniline, 4-methoxybenzilidene-4'-aminophenyl butyrate, and bis-(4'-n-octyloxybenzal)-2-chloro-1,4-phenylenediamine, and the compounds listed in U.S. Pat. No. 3,322,485.

The foregoing redox dopants of the present invention are also effective to improve the electrode life of organic electrochromic type devices. In such devices, the electrochromic layer is formed of a material characterized by absorbance of electromagnetic radiation which is altered by the influence of an electric field. Such material may show a weak absorption of visible radiation in the absence of an electric field and be fast transparent at this time. When they are subjected to an electric field, they absorb, for instance, the red extremity of the spectrum, so that they show a blue color. In a typical system, the electrochromic layer, which is electrically conductive, is sandwiched between two transparent conductive electrodes in devices such as of the type set forth in the drawing. When a difference of potential is applied to the electrodes by closing the switch, the electrochromic layer passes, say from a "clear" or uncolored state to a dark or colored state. One suitable organic electrochromic material is a viologen or "4-4-dipyridinium derivative" as set forth in detail in an article entitled "New Electrochromic Memory Display", Appl. Phys. Lett. Vol. 23, No. 2, July 15, 1973. Another suitable organic electrochromic material is a red or yellow monopyridinium derivative. In the foregoing electrochromic layer, the redox dopants of the present invention may comprise on the order of 0.5% to 5% by weight of the electrochromic materials.

The redox dopants of the present invention are also suitable to extend the electrode life of cataphoresis electro-optical display devices as of the type illustrated in the drawing. In such systems, the liquid crystal is replaced by a cataphoretic medium characterized by molecular optical direction which is altered under the influence of an electric field depending upon the optical anisotropy of the medium. For example, it has been reported that a dye liquid medium in random molecular orientation prior to the application of an electric field will rotate into alignment in a single direction under the electric field, so that a contrast occurs between the energized and unenergized portions.

What is claimed is:

1. In an electro-optical display device of the field mode including first and second electrodes comprising conductivity surfaces on opposed plates, a layer of liquid crystal medium having twisted nematic properties at room temperature disposed between said electrodes, and means for establishing an electrical potential between said electrodes, the improvement comprising a dopant comprising ascorbic acid in solution in the liquid crystal medium to increase the life of the electrodes.

2. The display device of claim 1 in which said dopant comprises from 0.05% to 1% by weight of said liquid crystal medium.

3. The display device of claim 1 in which said dopant comprises from 0.1% to 0.3% by weight of said liquid crystal medium.

4. The display device of claim 1 in which said electrodes are transparent.

5. The display device of claim 4 in which said electrodes are formed of a material selected from the group consisting of tin oxide and indium oxide.

6. The display device of claim 1 in which said liquid crystal medium is selected from the group consisting of Schiff bases, esters, and biphenyls.

7. The display device of claim 1 in which said liquid crystal medium is of the Schiff base type.

* * * * *